US008291086B2

(12) United States Patent
Salt

(10) Patent No.: US 8,291,086 B2
(45) Date of Patent: Oct. 16, 2012

(54) METHOD AND SYSTEM FOR ACCESSING DATA IN AN ENTERPRISE INFORMATION SYSTEM

(75) Inventor: Daniel Salt, Cambridge (GB)

(73) Assignee: General Electric Company, Schenectady, NY (US)

( * ) Notice: Subject to any disclaimer, the term of this patent is extended or adjusted under 35 U.S.C. 154(b) by 245 days.

(21) Appl. No.: 12/009,488

(22) Filed: Jan. 18, 2008

(65) Prior Publication Data

US 2009/0187663 A1 Jul. 23, 2009

(51) Int. Cl.
*G06F 17/30* (2006.01)
(52) U.S. Cl. ............. 709/227; 709/228; 709/231; 710/2
(58) Field of Classification Search .................. 709/227, 709/228, 231, 224; 710/2
See application file for complete search history.

(56) References Cited

U.S. PATENT DOCUMENTS

| | | | |
|---|---|---|---|
| 5,504,921 A * | 4/1996 | Dev et al. ...................... | 709/223 |
| 6,259,972 B1 | 7/2001 | Sumic et al. | |
| 6,549,880 B1 | 4/2003 | Willoughby et al. | |
| 6,601,084 B1 * | 7/2003 | Bhaskaran et al. ........... | 718/105 |
| 6,687,574 B2 | 2/2004 | Pietrowicz et al. | |
| 6,721,794 B2 * | 4/2004 | Taylor et al. ................... | 709/231 |
| 6,745,286 B2 * | 6/2004 | Staub et al. ..................... | 711/114 |
| 6,806,813 B1 | 10/2004 | Cheng et al. | |
| 6,880,089 B1 * | 4/2005 | Bommareddy et al. ........ | 726/11 |
| 7,032,037 B2 * | 4/2006 | Garnett et al. ..................... | 710/2 |
| 7,113,949 B1 | 9/2006 | House et al. | |
| 7,149,761 B2 | 12/2006 | Cooke et al. | |
| 7,164,883 B2 | 1/2007 | Rappaport et al. | |
| 7,295,133 B1 | 11/2007 | McCollough, Jr. | |
| 7,308,117 B2 | 12/2007 | Chitradon et al. | |
| 7,636,917 B2 * | 12/2009 | Darling et al. ................ | 718/105 |
| 2003/0023412 A1 | 1/2003 | Rappaport et al. | |
| 2003/0105903 A1 * | 6/2003 | Garnett et al. ................ | 710/300 |
| 2004/0024861 A1 * | 2/2004 | Coughlin ....................... | 709/224 |
| 2004/0024880 A1 * | 2/2004 | Elving et al. ................... | 709/227 |
| 2004/0024881 A1 * | 2/2004 | Elving et al. ................... | 709/227 |
| 2004/0236620 A1 | 11/2004 | Chauhan et al. | |
| 2005/0030194 A1 | 2/2005 | Cheng et al. | |
| 2005/0055435 A1 * | 3/2005 | Gbadegesin et al. .......... | 709/224 |
| 2006/0095969 A1 * | 5/2006 | Portolani et al. ................ | 726/23 |
| 2006/0155862 A1 * | 7/2006 | Kathi et al. ..................... | 709/229 |
| 2009/0064307 A1 * | 3/2009 | Holar et al. ...................... | 726/12 |

\* cited by examiner

*Primary Examiner* — Khanh Dinh
(74) *Attorney, Agent, or Firm* — Armstrong Teasdale LLP

(57) ABSTRACT

Systems and methods for requesting and receiving data from an enterprise information system are described. In accordance with one embodiment, the connector system includes an application server managed connection factory for receiving a data request, and a load balancer for assigning an enterprise information system server connection to the request.

12 Claims, 3 Drawing Sheets

EIS Request – Sequence Diagram

METHOD AND SYSTEM FOR ACCESSING DATA IN AN ENTERPRISE INFORMATION SYSTEM

BACKGROUND OF THE INVENTION

The field of the invention relates generally to information systems and more particularly, to methods and systems for facilitating sharing of enterprise information system data.

A geographic information system (GIS), sometimes referred to as a geographical information system or geospatial information system, is a system for capturing, storing, analyzing and managing data and associated attributes which are spatially referenced to the Earth. Such systems can, for example, integrate, store, analyze, share and display geographically referenced information. Geographic information systems can be used, for example, for resource management, asset management, sales, marketing, and logistics. A well known GIS is commonly referred to as Smallworld, and is commercially available from General Electric Company, Fairfield, Conn.

As one specific example, a GIS can be used by a utility (e.g., a public utility that distributes electricity) that deploys complex GIS-based applications to hundreds of people across the enterprise to manage complex utility and telecommunications networks. Such a GIS can be used in the utility setting, for example, to plan a distribution network within a particular region.

Many enterprises interested in deploying geographic information systems have significant investments in enterprise information systems (EISs). Such EISs can sometimes be legacy systems that have been deployed for years. Integrating the numerous EISs across a large enterprise to facilitate data and application sharing can be very costly and difficult. Once integration is achieved, continual maintenance, support, and creation of new applications can also be complicated and costly. In addition to integrating EISs, including legacy systems, adding new systems into an existing network can add additional cost and complexity.

BRIEF DESCRIPTION OF THE INVENTION

In one embodiment, a connector system for requesting information from an enterprise information system is described. In the example embodiment, the connector system includes an application server managed connection factory for receiving a data request, and a load balancer for assigning an enterprise information system server connection to the request.

In another embodiment, a method for communicating a data request to an enterprise information system from a service is described. The method includes receiving the request at an application server managed connection factory, and assigning an enterprise information system server connection to the request based on a load balance.

In yet another embodiment, a connector system for requesting information from an enterprise information system is described. In this example embodiment, the connector system includes a geographic information system connection factory for receiving a data request from a service, and an application server managed connection factory for receiving the data request from the geographic information system factory. A resource adapter corresponds the request with a particular enterprise information system, and a load balancer assigns an enterprise information system server connection to the request.

DETAILED DESCRIPTION OF THE INVENTION

Figure 1:
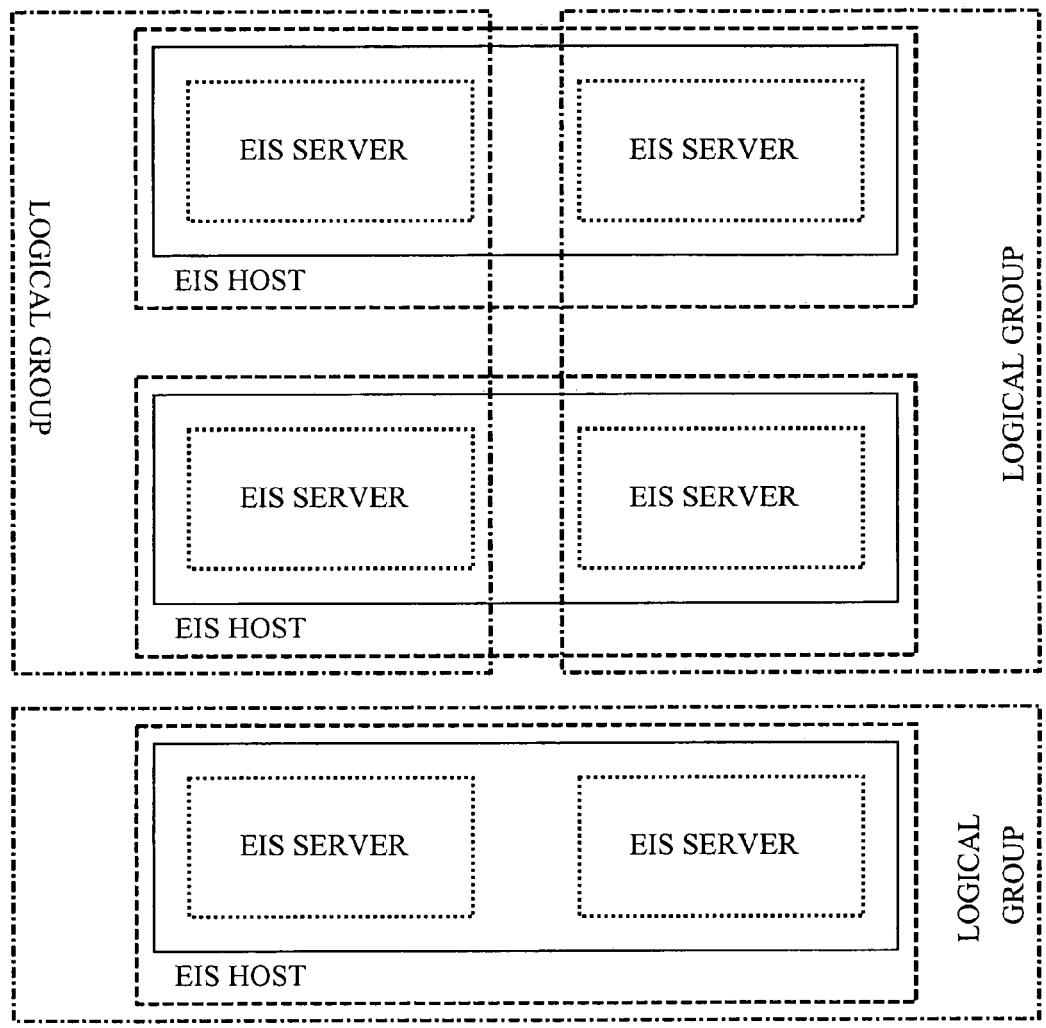
FIG. 1 schematically illustrates an exemplary EIS Server view, an exemplary EIS Host view, and an exemplary EIS Logical Group view.

The present invention is described here in detail with reference to a particular geographic information system (GIS) commonly referred to as Smallworld, which is commercially available from General Electric Company, Fairfield, Conn. The present invention is not limited to implementation and use in connection with any one specific GIS, and can be used in connection with other GISs. In addition, the present invention is specifically described below in connection with the Java 2 platform Enterprise Edition (J2EE), which is commercially available from Sun Microsystems, Inc., Palo Alto, Calif. The present invention is not limited to implementation and use in connection with J2EE, and can be used in connection with other systems as well.

Set forth below are details relating to a J2EE connector for connecting to, managing, and administering service providers in a Smallworld system context. The connector is sometimes referred to herein as a Smallworld Java Connector, and such connector is described as an implementation of a J2EE Connector Architecture (JCA) Resource Adapter. Such connector is an application-server independent component that provides connectivity to a Smallworld Service Provider. Details relating to the JCA specification are publicly available from Sun Microsystems, inc. Palo Alto, Calif.

In one embodiment, the Smallworld Java Connector has two principal classes: JCA implementation classes and Smallworld Connection Management classes. In this particular implementation, components outside of the JCA Resource Adapter are not permitted to create socket connections, and are discouraged from creating additional threads.

The Smallworld Java Connector implements the necessary JCA classes for Connection Management. Exemplary interfaces are set forth in the table below. SIAS, as referred to in the table and used herein, refers to the Smallworld Internet Application Server.

| Classes Package com.gesmallworld.sias.connector.managed | |
|---|---|
| SmallworldResourceAdapter | implements javax.resource.spi.ResourceAdapter |
| SIASManagedConnectionFactory | Implements javax.resource.spi.-ManagedConnectionFactory |
| SIASManagedConnection | Implements javax.resource.spi.-ManagedConnection |
| Package com.gesmallworld.sias.connector | |
| GISConnectionFactoryImpl | implements GISConnectionFactory |
| GISConnectionImpl | implements GISConnection |
| Interfaces Package com.gesmallworld.sias.connector | |
| GISConnectionFactory | Extends javax.resource.cci.ConnectionFactory |
| GISConnection | Extends javax.resource.cci.Connection |

The Smallworld Java Connector incorporates load balancing, and physical connections to the EIS are allocated at the time a request is physically sent to the EIS, based on the allocation rules of the load balancer (for example, least loaded, round-robin, least recently used). The Smallworld Java Connector is a connection-less Resource Adapter. The JCA Connection class can be implemented and used, although use of the JCA Connection is optional.

Referring to FIG. 1, three logical "views" of the system are illustrated in schematic form. Specficially, FIG. 1 illustrates an EIS Server view, an EIS Host view, and an EIS Logical Group view. The EIS Server view illustrates Service Provider instances managed by the system. There is a one-to-one relationship between an EIS Server and a Smallworld Service Provider instance. The EIS Host view illustrates all the "EIS Servers" (Smallworld Service Provider instances) running on a single machine (EIS Host). Each EIS Host is managed by an agent, as described below. The EIS Logical Group view contains one or more EIS Servers. These EIS Servers need not originate from the same EIS Host. Not all EIS Servers on an EIS Host need belong to the same EIS Logical Group. An example of this view in use would be for functional task. In this example, a number of EIS Hosts within a system each configure a Smallworld Service Provider instance that handles only "plot" requests. An EIS Logical Group can then be created to allocate (specifically) plot requests to always be assigned to these EIS Servers. Additionally, these instances can be administered collectively.

Figure 2:
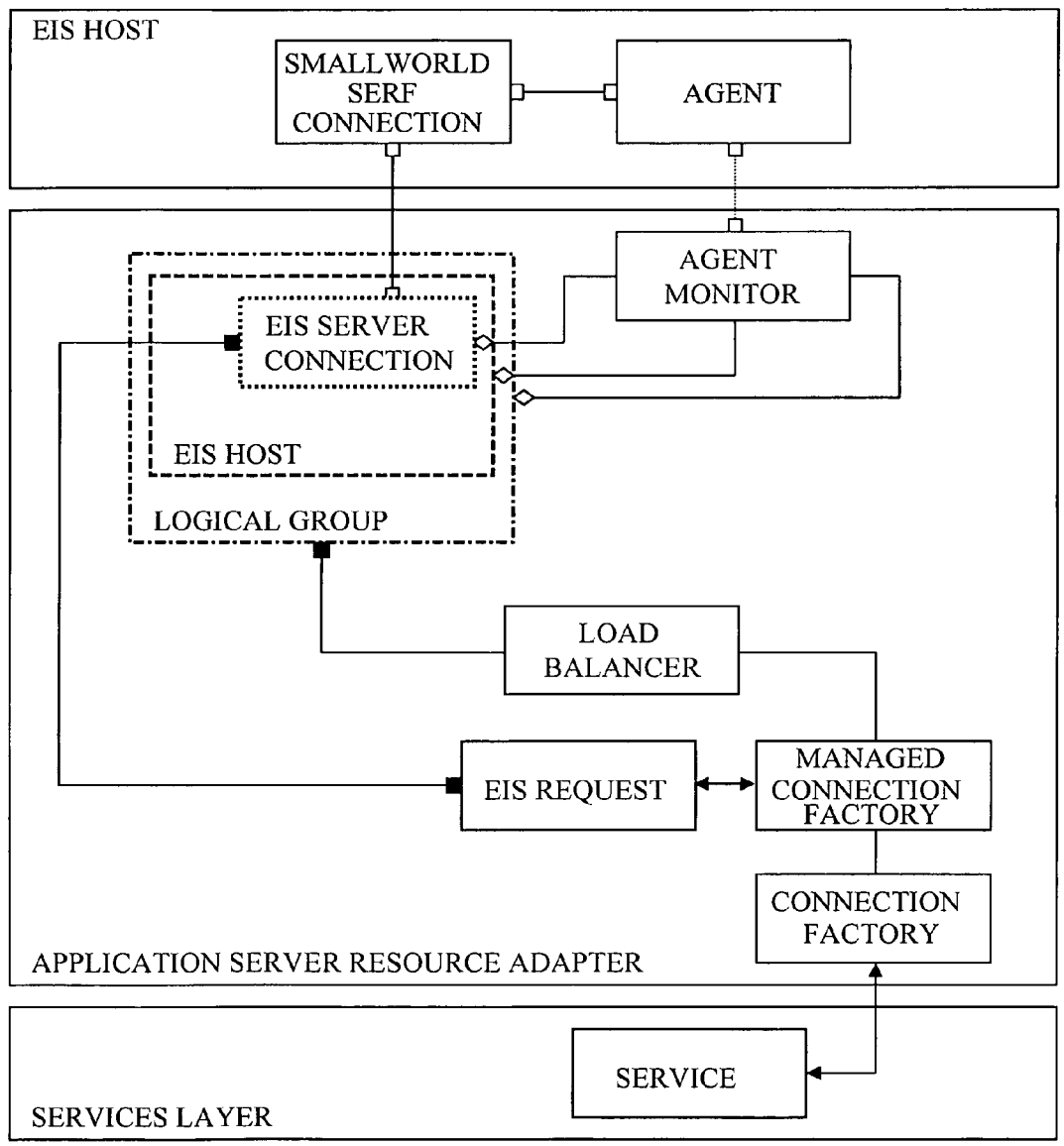
FIG. 2 illustrates exemplary components used to manage EIS connections.

FIG. 2 illustrates components used to manage EIS connections. Specifically, the relationship between a Service class and the corresponding Smallworld instance from which it requires data is illustrated. The components in between are in place to provide connection management and administration of the EIS servers. Each component and its relationships are described below.

Specifically, still referring to FIG. 2, on the EIS Host there exists a single Agent component, and one or more Smallworld Service Provider instances. The Smallworld Service Provider is responsible for communicating data between the Smallworld instance and the Application Server. Within the Smallworld Java Connector exists the EIS Server Connection, which maps directly onto the "EIS Server" logical view and implements the physical connection between the Smallworld Service Provider instance and the Application Server. Logically, this EIS Server Connection can be a member of a number of other logical views.

The administration of EIS Server Connections, EIS Hosts and EIS Logical Groups, is managed by an Agent Monitor. The Agent Monitor is responsible for acting as a broker between the Application Server and the EIS Server agent(s) to send/receive administrative commands/data.

The management (e.g., when assigned, connection limits, crash detection, recovery) of the JCA components is assigned to the JCA interfaces within the system, and the Load Balancer. The JCA interfaces, shown in FIG. 2 as Managed Connection Factory and Connection Factory are managed by the underlying implementation of the JCA within the Application Server. This underlying implementation deals with the memory, security and transaction management of these components, as well as their pooling (how/when they are created and/or re-used). As is well known, a Connection Factory, sometimes referred to as a Connection Factory object, encapsulates a set of connection configuration parameters that has been defined by an administrator. A client uses this object to create a connection with a Java Message Service (JMS) provider.

The Load Balancer is not part of the JCA specification, and works closely with all other components within the system to provide scalable and reliable system performance. The Load Balancer is described below in more detail.

The service layer is the overall "consumer" as illustrated in FIG. 2. The Services Layer sends a requests to the Connection Factory, via the components provided as part of the JCA specification. The requests are processed by the "managed" counterparts that are allocated and managed by the Application Server. Each time the Managed Connection Factory desires to execute a request, an appropriate EIS Server Connection is assigned from the Load Balancer. The Load Balancer monitors the overall usage and dynamically assigns the EIS Server Connection based on the algorithm assigned to it (e.g., by default, Round-Robin). Once the request is complete, the EIS Server Connection is returned to the Load Balancer and reused for subsequent calls.

The application programming interface of the connector is set forth in the appendices. Specifically, Appendix I sets forth the EIS Request, Appendix II sets forth the GIS Connection Factory, Appendix III sets forth the SIAS Meta Request, Appendix IV sets forth the SIAS Meta Response, and Appendix V sets forth the Cancel Meta Request.

The Load Balancer component in the Smallworld Java Connector includes a "pluggable" facility to allow different load balancing algorithms to be used to allocate the connection, without re-compilation of the Smallworld Connector Code. The Load Balancer Algorithm interface includes a sub-algorithm (getConnection), which supplies a List of EIS Server Connections and expects a single EIS Server Connection to be returned, or null (if no connection could be allocated). The algorithm can use the various helper methods of the Server Connection (e.g. number of used connections) to determine which connection to allocate.

Each EIS Logical Group has its own Load Balancer instance, and individual Logical Groups can be configured to use different load balancing algorithms. By default, the Smallworld Java Connector contains a Round-Robin load balancing algorithm. In accordance with the Round Robin algorithm, and starting from the last known position in the list of available EIS Server Connections (or the connection listed at the beginning of the list for selecting the first connection), the next EIS Server Connection with an available connection is selected. If the end of the list is reached, operations return to the start of the list and continue until the original start point is reached. If no connection meets the above criteria, a null is returned. In this case, the Round Robin algorithm class need only store the last used position in the list. For more complicated algorithms, the class may need to store more complex information.

Regarding Java Management Extension (JMX) interfaces, JMX MBeans are available to any application (Java/Internet) that can access the Application Server MBean Server implementation. The JMX MBeans provide a management interface to many of the components within the Smallworld Java Connector. As is well known, an MBean (managed bean) is a Java object that represents a manageable resource. Details regarding such interfaces are set forth in Appendix VI.

Figure 3:
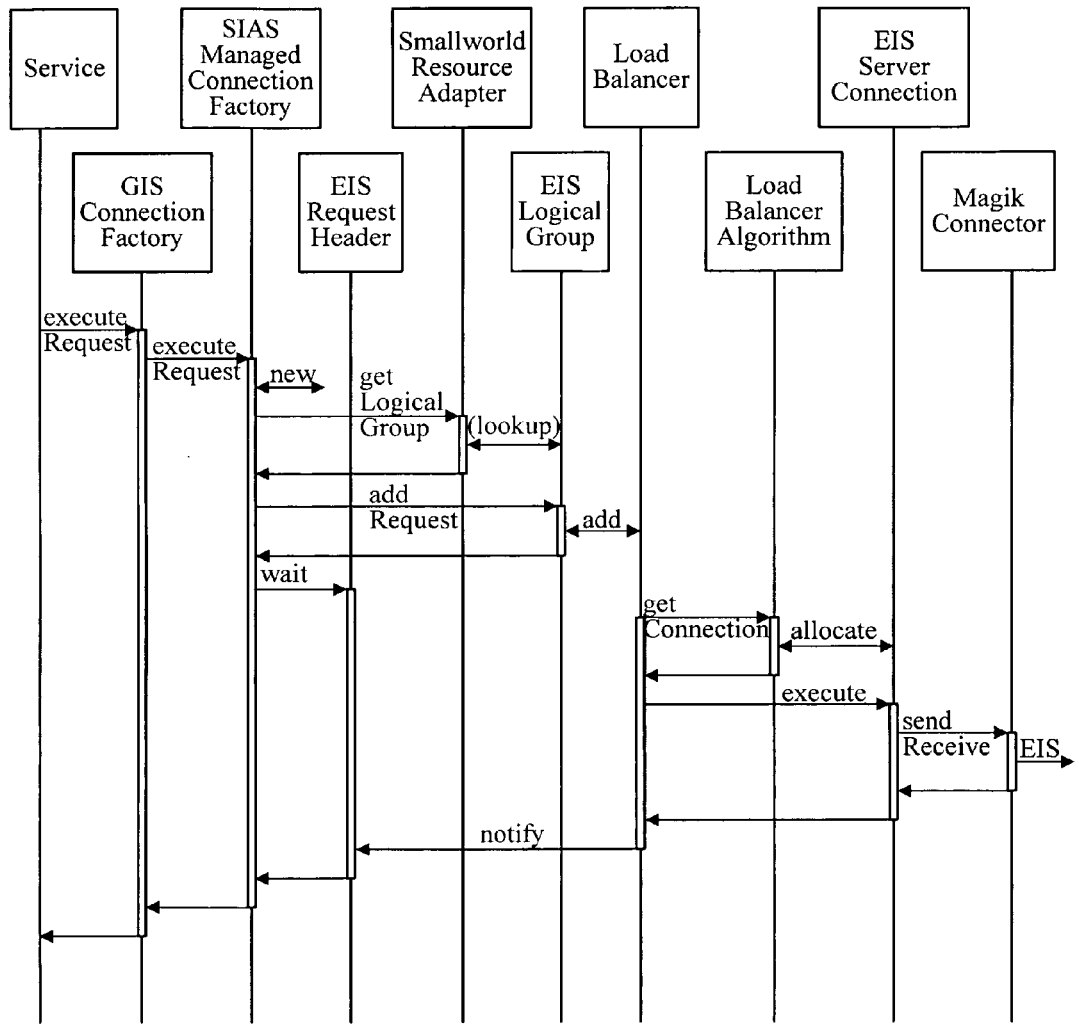
FIG. 3 sets forth the EIS Request sequence diagram.

FIG. 3 sets forth the EIS Request sequence diagram described above. As shown in FIG. 3, Service executes a request by communicating with the GIS Connection Factory. The Connection Factory passes the request to the SIAS Managed Connection Factory, and passes the request to the EIS Request Header, the Smallworld Resource Adapter, and then the EIS Logical Group. The request is then submitted to the Load Balancer, and the Load Balancer Algorithm is then utilized to select, or allocate, an EIS Server Connection. The request then passes to, in the exemplary embodiment, the Magik Connector and the EIS data can then be accessed. The Magik Connector refers to a known connector based on the Magik object-oriented programming language that supports multiple inheritance and polymorphisim. The Magik Connector is part of the Smallworld system/technology platform and designed to implement complex applications for enterprise utilities such as power distribution and telecommunications.

The above described connector, which is specifically described and illustrated as an Application Server Resource Adapter, is an application-server independent component that provides connectivity to a Smallworld Service Provider. Such a connector facilitates integrating geographic information systems and enterprise information systems into one network, which facilitates not only integration of such systems, but also facilitates ease of maintenance, support, and creation of new applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

While the invention has been described in terms of various specific embodiments, those skilled in the art will recognize that the invention can be practiced with modification within the spirit and scope of the claims.

What is claimed is:

1. A connector system for requesting information from an enterprise information system, said connector system comprising:
   a geographic information system connection factory for receiving a data request,
   an application server managed connection factory coupled to said geographic information system connection factory for receiving the data request from said geographic information system connection factory, wherein said application server managed connection factory is configured to encapsulate a plurality of connection configuration parameters for use in connecting to the enterprise information system, and
   a load balancer coupled to said application server managed connection factory, said load balancer configured to:
      access a list of available enterprise information system server connections,
      assign an enterprise information system server connection to the request from the list of available enterprise information system server connections, and
      reuse an enterprise information system server connection used by said application server.

2. A connector system in accordance with claim 1 further comprising a request header which provides said managed connection factory with request values, and a resource adapter which corresponds the request with a particular enterprise information system.

3. A connector system in accordance with claim 1 where said load balancer assigns the enterprise information system server connection using at least one of a default and a Round-Robin algorithm.

4. A connector system in accordance with claim 1 further comprising an Agent Monitor for communicating with the enterprise information system to send/receive administrative commands/data.

5. A method for communicating a data request to an enterprise information system from a service, said method comprising:
   receiving the request at a geographic information system connection factory,
   communicating the request from the geographic information system connection factory to an application server managed connection factory, wherein the application server managed connection factory is configured to encapsulate a plurality of connection configuration parameters for use in connecting to the enterprise information system,
   accessing a list of available enterprise information system server connections,
   assigning an enterprise information system server connection from the list of available enterprise information system server connections to the request based on a load balancer coupled to the application server managed connection factory, and
   reusing an enterprise information system server connection for subsequent requests.

6. A method in accordance with claim 5 further comprising obtaining header values associated with the request header and providing the header values to the managed connection factory, and relating the request with a particular enterprise information system based on the header values.

7. A method in accordance with claim 5 where the load balancer is based on at least one of a default and a Round-Robin algorithm.

8. A method in accordance with claim 5 further comprising communicating with the enterprise information system to send/receive administrative commands/data via an Agent Monitor.

9. A connector system for requesting information from an enterprise information system, said connector system comprising:
   a geographic information system connection factory for receiving a data request from a service,
   an application server managed connection factory for receiving the data request from said geographic information system factory, wherein said application server managed connection factory is configured to encapsulate a plurality of connection configuration parameters for use in connecting to the enterprise information system,
   a resource adapter which corresponds the request with a particular enterprise information system, and
   a load balancer coupled to said application server managed connection factory, said load balancer configured to:
      access a list of available enterprise information system server connections,
      assign an enterprise information system server connection to the request from the list of available enterprise information system server connections, and
      reuse an enterprise information system server connection used by the application server.

10. A connector system in accordance with claim 9 further comprising a request header which provides said managed connection factory with request values.

11. A connector system in accordance with claim 9 where said load balancer assigns the enterprise information system server connection using at least one of a default and a Round-Robin algorithm.

12. A connector system in accordance with claim 9 further comprising an Agent Monitor for communicating with the enterprise information system to send/receive administrative commands/data.

* * * * *